United States Patent [19]

Brueggemann

[11] Patent Number: 5,063,292

[45] Date of Patent: Nov. 5, 1991

[54] OPTICAL SCANNER WITH REDUCED END OF SCAN WOBBLE HAVING AN EVEN NUMBER OF BEAM REFLECTIONS

[75] Inventor: Harry P. Brueggemann, San Marino, Calif.

[73] Assignee: Xerox Corporation, Stamford, Conn.

[21] Appl. No.: 515,799

[22] Filed: Apr. 27, 1990

[51] Int. Cl.$^5$ .............................................. H01J 5/16
[52] U.S. Cl. ............................ 250/236; 359/205, 216
[58] Field of Search ....................... 250/234, 235, 236; 350/6.8, 6.7

[56] References Cited

U.S. PATENT DOCUMENTS

| | | | |
|---|---|---|---|
| 3,866,038 | 2/1975 | Korth | 250/236 |
| 3,897,132 | 7/1975 | Meeussen et al. | 350/6.7 |
| 3,973,825 | 8/1976 | Starkweather | 350/6.7 |
| 4,054,360 | 10/1977 | Oosaka et al. | 350/6.8 |
| 4,247,160 | 1/1981 | Brueggemann | 350/6.8 |
| 4,429,948 | 2/1984 | Garwin | 350/6.8 |
| 4,537,465 | 8/1985 | Sherman et al. | 350/6.8 |
| 4,639,141 | 1/1987 | Kawabara et al. | 350/6.5 |
| 4,682,842 | 7/1987 | Brueggemann | 350/6.7 |
| 4,796,962 | 1/1989 | De Jager et al. | 350/6.8 |
| 4,802,721 | 2/1989 | Fujita | 350/6.8 |
| 4,805,974 | 2/1989 | Brueggemann et al. | 350/6.7 |
| 4,898,437 | 2/1990 | Brueggemann | 350/6.7 |

Primary Examiner—David C. Nelms
Assistant Examiner—Que T. Le
Attorney, Agent, or Firm—William Propp

[57] ABSTRACT

An optical scanning system reduces wobble at the ends of the scan line by twice reflecting a laser beam off a facet of a rotating polygon mirror, then passing the beam through a cylindrical scan lens system which will focus the beam in the scan plane to the scan line and then reflecting the beam off a cylindrical mirror to focus the beam in the cross-scan plane to the scan line.

8 Claims, 3 Drawing Sheets

OPTICAL SCANNER WITH REDUCED END OF SCAN WOBBLE HAVING AN EVEN NUMBER OF BEAM REFLECTIONS

BACKGROUND OF THE INVENTION

This invention relates to an optical scanner utilizing a rotating polygon mirror, and more particularly, to an optical scanner utilizing a rotating polygon mirror wherein wobble is reduced at the ends of the scan lines.

Many conventional raster optical scanners utilize a multi-faceted rotating polygon mirror as the scanning element. A collimated beam of light, as for example from a laser, strikes the facets of the rotating polygon which causes the reflected light to revolve about an axis near the center of rotation of the rotating polygon and scan a straight line. This reflected light can be utilized to scan a document at the input end of an imaging system or can be used to impinge upon a photosensitive medium, such as a xerographic drum in the output mode.

Many systems have been disclosed in the art to overcome various optical and other distortions caused by rotating polygon mirror optical scanners. Bow is defined as an error in the optical scanning system caused by the beam not being exactly horizontal prior to striking the facet. The scan line deviates from a straight line and is bowed in the middle of the scan line. Wobble is caused by the facet not being exactly parallel to the vertical axis, thereby angling the beam reflected from the facet up or down a small amount.

One conventional rotating polygon mirror optical scanner 10, known in the art, is disclosed with regard to FIG. 1. A laser beam 12 strikes a facet 14 of the rotating polygon mirror 16. The laser beam is in the same horizontal plane with the facet and the facets are parallel to the vertical axis, the axis of rotation of the polygon mirror. By prior lens elements not shown, the laser beam 12 is collimated in the scan or horizontal plane and converging in the cross-scan or vertical plane. The beam is focused in the cross-scan plane to form a horizontal at the facet.

The laser beam 12 reflected from the facet is still collimated in the scan plane and is now diverging in the cross-scan plane. The beam then passes through a scan lens 18. The scan lens may be cylindrical in the scan plane and plano in the cross-scan plane. Thus, the scan lens converges the scan portion of the beam focusing it on the scan line but allows the diverging cross-scan portion of the beam to pass through uneffected.

The beam 12 then strikes the cylindrical wobble mirror 20 which reflects the beam to the scan line 22. The wobble mirror is positive and cylindrical in the cross-scan plane and flat in the scan plane. Thus, the wobble mirror converges the previously diverging cross-scan portion of the beam focusing it on the scan line but allows the converging cross-scan portion of the beam focused by the scan lens on the scan line to pass through uneffected.

The collimation, convergence, divergence and focus of the laser beam 12 unfolded in both scan and cross-scan plane is shown in FIG. 2. In the scan plane, the laser beam 12 is collimated and is reflected off the rotating mirror facet 14 uneffected. The collimated beam is converged by the cylindrical portion of the scan lens 18, reflected off the wobble mirror 20 uneffected to focus along the scan line 22.

In the cross-scan plane, the laser beam 12 is converging and focused along a line at the rotating mirror facet 14. The reflected diverging beam passes through the plano portion of the scan lens 18 uneffected but is converged by reflecting from the positive cylindrical wobble mirror 20 to focus along the scan line 22.

Bow is caused by the beam not being exactly horizontal prior to striking the facet. In this optical scanner of the prior art, the beam is defined as horizontal so there is no bow.

However, there is wobble in this optical scanner caused by the facet not being exactly parallel to the vertical axis. Therefore, the beam reflected off the facet is angled up or down a small amount. The first order effect of this wobble can be removed by using the wobble mirror. Since, in the cross-scan plane or vertical direction, the beam is focused at the facet, and since the mirror will again focus the beam at the scan line, the angle, either up or down, will be removed. That is, if the beam is going upward a small amount, the mirror, by refocusing the beam, will bend it down an equal amount to strike the scan line at the same spot.

What slight wobble remains in the optical scanner 10 is a second order effect caused by focusing problems. First, the beam, vertically, can not be focused at the facet along the entire scan line since the field is curved by the difference in glass thickness as the beam scans through thinner and thicker portions of the scan lens. To the extent that the beam is out of focus as it hits the scan line, so also will have a small wobble at the ends of the scan line.

Another problem with the prior art optical scanner 10 is that some of the prior lens elements used to produce laser beam 12 are very expensive. Another factor in the high costs of optical scanner 10 is the high fabrication and assembly tolerances required for the optical scanning system to work efficiently and properly.

It has been proposed that wobble be canceled by a double reflection from the facets of the rotating polygon, such facets being parallel with the axis of rotation of the rotating polygon. See Meeussen et al., U.S. Pat. No. 3,897,132. After a light beam normally incident on a facet is reflected by the facet, the light beam is returned to the same facet, by an arrangement of even numbered mirror reflections, for a second reflection. Wobble introduced at the first facet reflection is canceled by the second facet reflection.

However, in such an optical scanning system with polygon facets parallel with the axis of rotation of the polygon mirror, that is having a zero draft angle, bow effects are excessive. Reset U.S. Pat No. 4,898,437, in the name of the same inventor and assignee of the present application and incorporated by reference in this application, discloses a rotating polygon mirror optical scanner 24 in FIG. 3 for corrected wobble by a double reflection from the facet with the wobble correction being achieved without bow effects. A laser beam 26 strikes a facet 28 of the rotating polygon mirror 30. The beam is in the same vertical plane with the polygon axis and offset above the scan plane. By prior lens elements not shown, the laser beam 26 is collimated in both the scan and cross-scan planes.

Rather than having the plane of each facet parallel to the vertical axis of rotation of the polygon mirror, the facets of this rotating mirror are tilted at an angle, the draft angle, to the axis of rotation. The collimated beam strikes the facet 28 at a first angle of incidence and is reflected to first mirror 32. The beam is then reflected to second mirror 34 where it is reflected back toward facet 28 at a second angle of incidence. The beam is reflected from the facet to the scan lens 36.

The first and second mirrors, as well as the facet, are all flat surfaces with no optical power. Thus the beam remains collimated.

The beam 26 passes through the scan lens 36. The scan lens is spherical, focusing the beam in both the scan and cross-scan plane. Thus, the scan lens converges both the scan and cross-scan portion of the plane focusing it along the scan line 38.

The collimated, convergence and focus of the laser beam 26 unfolded in both scan and cross-scan plane is shown in FIG. 4. In the scan plane, the laser beam 26 is collimated and is reflected off the rotating mirror facet 28, the first mirror 32, the second mirror 34 and the facet 28 again uneffected. The collimated beam is converged by the spherical scan lens 36 to focus along the scan line 38.

In the cross-scan plane, the laser beam 26 is collimated and is reflected off the rotating mirror facet 28, the first mirror 32, the second mirror 34 and the facet 28 again uneffected. The collimated beam is converged by the spherical scan lens 36 to focus along the scan line 38.

Like Meeussen et al, by two further reflections from flat mirrors, the light beam is made to reimpinge upon the same facet correcting the first order wobble but now with no effect on bow. Three design variables are used to reduce the effects of bow in the optical scanner 24; namely, the angle of incidence at the first facet reflection, the angle of incidence at the second facet reflection, and the draft angle of the facets of the rotating polygon mirror.

The optical scanner of U.S. Pat. No. 4,898,437 was developed to perform at resolution standards of scan lines of 300 spots per inch. The features of concern were linearity, no bow over the scan line, diffraction limited optics and wobble less than 10 percent of the spot size everywhere along the scan line. The current resolution standard is 400 spots per inch but the design must be capable of being extended to 600 spots per inch, the next resolution standard. The features of concern are the same but performance requirements have doubled.

The optical scanner of U.S. Pat. No. 4,898,437 will perform at 600 spots per inch in all aspects except wobble. As shown in FIG. 5 (not drawn to scale), the scan line 40 deviates at the ends 42 from a straight line 44. At the ends of the scan lines from this prior art optical scanner with a spherical lens, wobble from the higher orders is two to three times larger than the prior art optical scanner with the cylindrical scan lens and cylindrical wobble mirror. The wobble exceeds 10 precent of one six-hundredth of an inch.

The end of scan line wobble of the optical scanner of U.S. Pat. No. 4,898,437 is a hard characteristic which cannot be corrected by adjusting the elements of the optical scanning system.

It is an object of this invention to reduce end of scan lines wobble in a rotating polygon mirror optical scanner while providing no wobble over the rest of the scan line and no bow over the scan line.

SUMMARY OF THE INVENTION

In accordance with the present invention, wobble is reduced at the ends of the scan line from an optical scanning system. A collimated laser beam is initially twice reflected off a draft angled facet of a rotating polygon mirror to eliminate bow and wobble. The still collimated beam is first passed through a cylindrical scan lens system which will focus the beam in the scan plane to the scan line and then reflected off a cylindrical mirror to focus the beam in the cross-scan plane.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
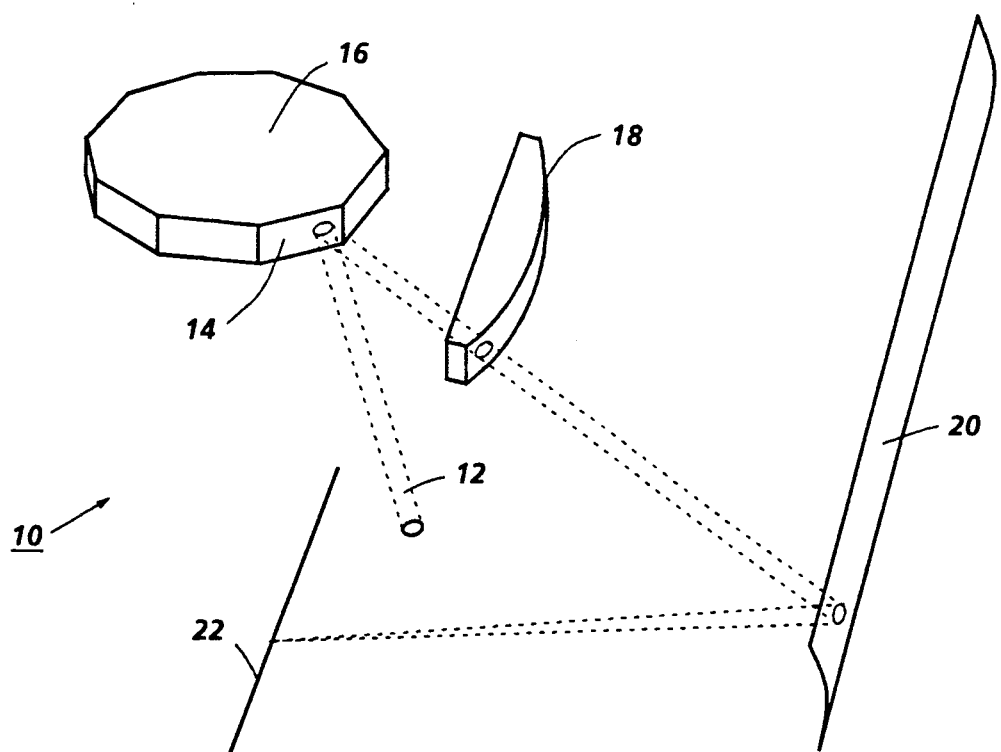
FIG. 1 is a schematic illustration of a perspective elevation of a prior art rotating mirror scanner.
Figure 2:
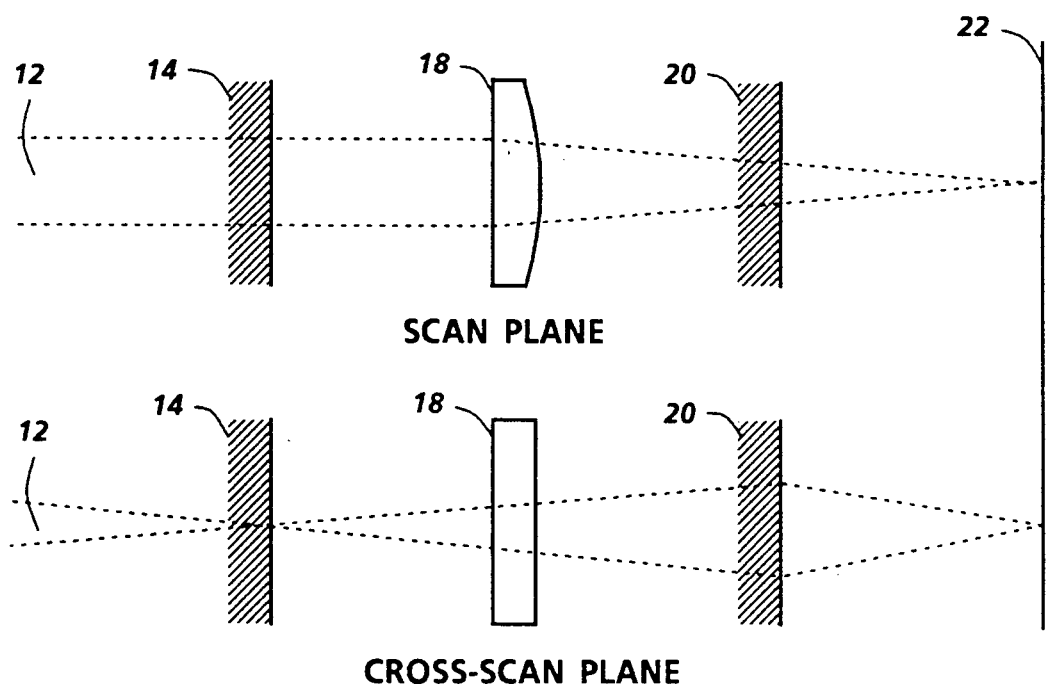
FIG. 2 is a schematic illustration of the unfolded beam in the scan and cross-scan planes traveling through the prior art rotating mirror scanner of FIG. 1.
Figure 3:
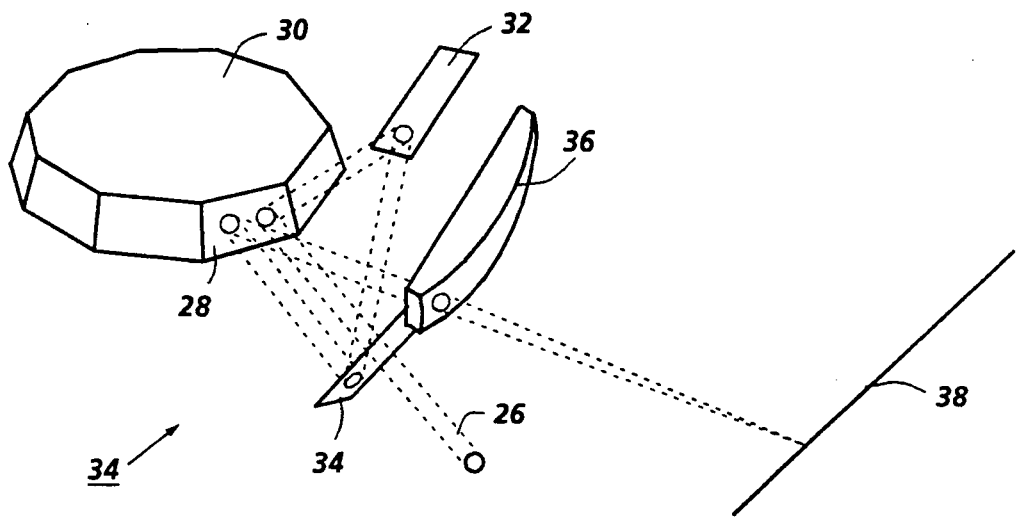
FIG. 3 is a schematic illustration of a perspective elevation of another prior art rotating mirror scanner.
Figure 4:
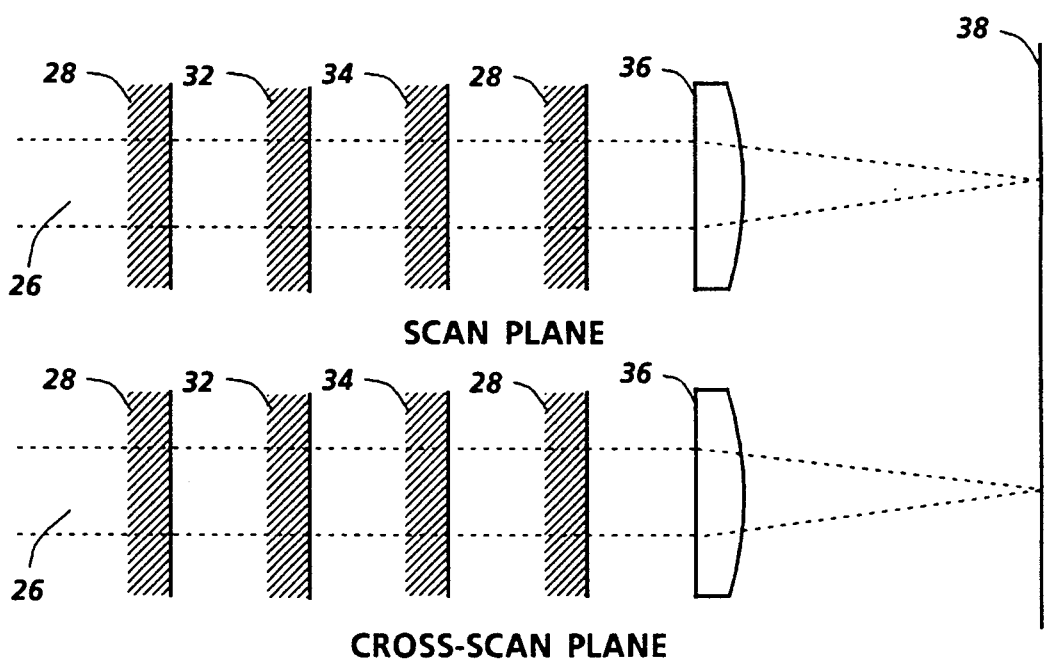
FIG. 4 is a schematic illustration of the unfolded beam in the scan and cross-scan planes traveling through the prior art rotating mirror scanner of FIG. 3.
Figure 5:
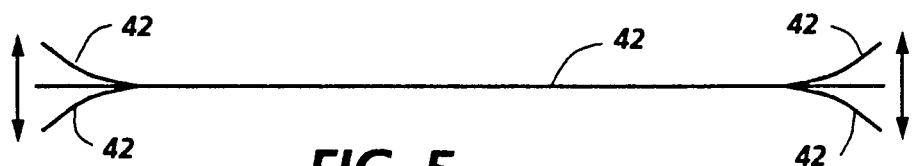
FIG. 5 is a schematic illustration (not drawn to scale) of the scan line of the prior art rotating mirror scanner of FIG. 3 in comparsion with a straight line.
Figure 6:
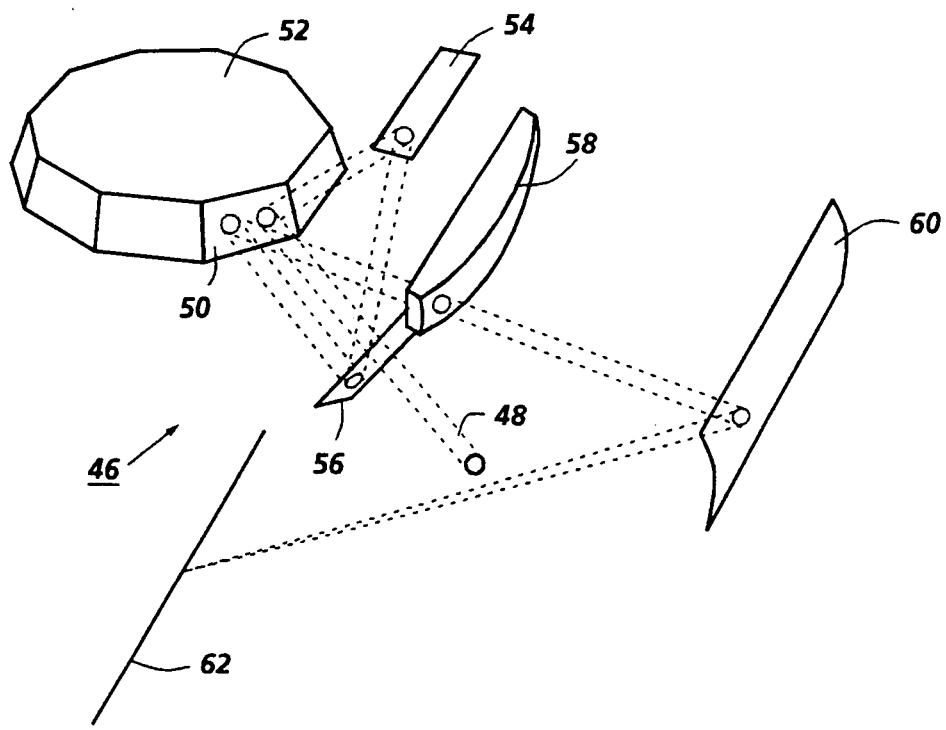
FIG. 6 is a schematic illustration of a perspective elevation of the rotating mirror scanner formed according to the present invention.

Reference is now made to FIG. 6 wherein there is disclosed an optical scanner 46 for reducing wobble at the ends of the scan lines. A laser beam 48 strikes a facet 50 of the rotating polygon mirror 52. The beam is in the same vertical plane with the polygon axis and offset below the scan plane. The laser beam 48 is preferably elliptical in shape with the major axis or wide portion of the beam in the scan plane and the minor axis or narrow portion of the beam in the cross-scan plane and collimated in both planes by prior lens elements not shown or as a natural result of the use of laser diodes to produce the beam. If not elliptical, the beam can be circular in shape.

The facets of this rotating mirror are tilted at an angle, the draft angle, to the axis of rotation of the polygon mirror. The collimated beam strikes the facet 50 at a first angle of incidence and is reflected to first mirror 54. The beam is then reflected to second mirror 56 where it is reflected back toward facet 50 at a second angle of incidence. The beam is reflected from the facet to the scan lens 58. Two flat mirrors are used in this embodiment of the invention, although the only requirement is that there be an arrangement of even numbered mirror reflections between the beam striking the facet the first and second time.

The first and second mirrors, as well as the facet, are all flat surfaces with no optical power. Thus the beam remains collimated.

The beam 48 passes through a cylindrical scan lens system 58 which consists of at least one cylindrical scan lens. The scan lenses are cylindrical in the scan plane and plano in the cross-scan plane. Thus, the scan lens converges the scan portion of the beam focusing it on the scan line 62 but allows the collimated cross-scan portion of the beam to pass through uneffected. For the purposes of this embodiment of the invention, a single cylindrical scan lens is used.

The beam 48 then strikes the cylindrical mirror 60 which reflects the beam to the scan line 62. The mirror is positive and cylindrical in the cross-scan plane and flat in the scan plane. Thus, the cylindrical mirror converges the collimated cross-scan portion of the beam focusing it on the scan line but allows the converging cross-scan portion of the beam focused by the scan lens on the scan line to pass through uneffected.

Since the beam is focused to a point in both the scan and cross-scan planes at the scan line, the beam in the scan plane which is focused by the scan lens and the beam in the cross-scan plane which is focused by the cylindrical mirror have the same f/number, if the collimated beam at the polygon has an elliptical shape and the distance between the scan lens and the cylindrical lens is chosen appropriately.

Figure 7:
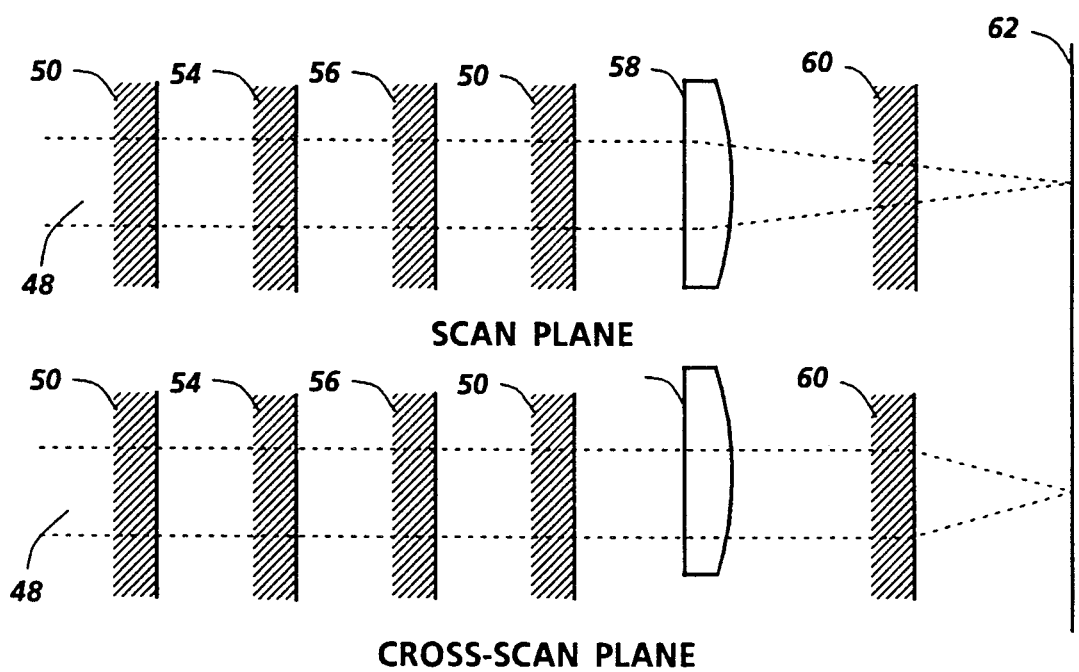
FIG. 7 is a schematic illustration of the unfolded beam in the scan and cross-scan planes traveling through the rotating mirror scanner of FIG. 6.

The collimated, convergence and focus of the laser beam 48 unfolded in both scan and cross-scan plane is shown in FIG. 7. In the scan plane, the laser beam 48 is collimated and is reflected off the rotating mirror facet 50, the first mirror 54, the second mirror 56 and the facet 50 again uneffected. The collimated beam is converged by the cylindrical portion of the scan lens 58, reflected off the cylindrical mirror 60 uneffected to focus along the scan line 62.

In the cross-scan plane, the laser beam 48 is collimated and is reflected off the rotating mirror facet 50, the mirror 54, the second mirror 56 and the facet 50 again uneffected. The collimated beam passes through the plano portion of the scan lens 58 uneffected but is converged by reflecting from the positive cylindrical mirror 60 to focus along the scan liner 62.

The cylindrical mirror 60 does not form an image of the facet at the scan line, as does the cylindrical wobble mirror of the prior art. The double facet reflection of the present application corrects the wobble at the center of the scan line. The cylindrical mirror 60 of the present application reduces the wobble at the ends of the scan line.

The cylindrical wobble mirror of the prior art zero field curvature, no matter what its optical power, while the corresponding cylinder lens of the prior art has strong field curvature as a necessary result of the strong optical power needed to image the facet at the scan line. Field curvature becomes an important consideration when the spots per inch exceed 300.

The lens components in U.S. Pat. No. 4,898,437 were spherical, to focus both the scan and cross-scan planes at the scan line. The wobble at the ends of the scan line is due to the cross-scan field curvature of the spherical scan lens.

To eliminate or greatly reduce the wobble at the ends of the scan line, the cylindrical scan lens 58 of the present application is plano in the cross-scan plane and has, no power. Even with no power in the cross-scan plane, the cylindrical scan lens can still create field curvature if the beam is diverging or converging in the cross-scan plane.

Thus, the beam is collimated in the cross-scan plane when passing through the cylindrical scan lens and is uneffected by the lens. The beam is focused on the scan line by the cylindrical mirror. There are no other components with power in the cross-scan plane.

The present invention uses a draft angle on the facets to take out bow and uses reflections from two mirrors between reflections off the same facet to take out the first order effect of wobble. The second order effect of wobble is removed by not focusing the light beam at the facet. Since there is no focus at the facet, there is no second order wobble caused by the focus. Wobble is reduced at the ends of the scan line by a fivefold factor.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is clamied is:

1. An optical scanning system for reducing wobble at the ends of a scan line in a scan plane comprising:
    a rotating polygon having a plurality of facets,
    a collimated laser beam directed onto one of said facets from a location offset below the scan plane,
    a mirror system to cause an even number of reflections of said laser beam before said laser beam is reflected off said facet a second time,
    a cylindrical scan lens system which focuses in the scan plane said laser beam twice reflected off said facet to said scan line, and
    a cylindrical mirror which focuses in a cross-scan plane said laser beam which has passed through said scan lens system to said line.

2. The optical scanning system for reducing wobble at the ends of a scan line in a scan plane of claim 1 wherein said laser beam is elliptical in shape.

3. The optical scanning system for reducing wobble at the ends of a scan line in a scan plane of claim 2 wherein said elliptical laser beam has the major axis in the scan plane and the minor axis in the cross-scan plane.

4. The optical scanning system for reducing wobble at the ends of a scan line in a scan plane of claim 1 wherein said laser beam is generated by a laser diode.

5. The optical scanning system for reducing wobble at the ends of a scan line in a scan plane of claim 1 wherein said cylindrical scan lens system comprises at least one cylindrical scan lens which is cylindrical in the scan plane and plano in the cross-scan plane.

6. The optical scanning system for reducing wobble at the ends of a scan line in a scan plane of claim 1 wherein said cylindrical mirror is cylindrical in the cross-scan plane and flat in scan plane.

7. The optical scanning system for reducing wobble at the ends of a scan line in a scan plane of claim 1 wherein said mirror system comprises two flat mirrors.

8. The optical scanning system for reducing wobble at the ends of a scan line in a scan plane of claim 1 wherein said rotating polygon has an axis of rotation and said facets have a predetermined draft angle with respect to said axis of rotation.

* * * * *